United States Patent

[11] 3,556,078

| [72] | Inventor | Robert L. McGaughey<br>Harrison, Ark. |
|---|---|---|
| [21] | Appl. No. | 841,005 |
| [22] | Filed | July 11, 1969 |
| [45] | Patented | Jan. 19, 1971 |
| [73] | Assignee | Southern Precision Industries, Inc.<br>Harrison, Ark.<br>a corporation of Arkansas |

[54] BARBECUE GRILL
10 Claims, 5 Drawing Figs.

| [52] | U.S. Cl. | 126/25, 126/285 |
|---|---|---|
| [51] | Int. Cl. | A47j 37/00, F23l 13/00, F24b 11/00 |
| [50] | Field of Search | 126/9, 25, 25A, 285 |

[56] References Cited
UNITED STATES PATENTS

| 1,725,521 | 8/1929 | Keiner | 126/25 |
| 3,045,582 | 7/1962 | Wells | 126/25X |
| 3,285,239 | 11/1966 | Drake | 126/25A |
| 3,452,736 | 7/1969 | Harff et al | 126/25 |

*Primary Examiner*—Charles J. Myhre
*Attorney*—Don M. Bradley

ABSTRACT: A barbecue grill cover having a top opening covered by a planar weather shield spaced vertically above the top of the body. Spaced apart, semicircular barrier walls integral with the shield define an air passage into the grill and a rotatable damper projecting through the shield regulates the passage.

PATENTED JAN 19 1971
3,556,078
SHEET 1 OF 2
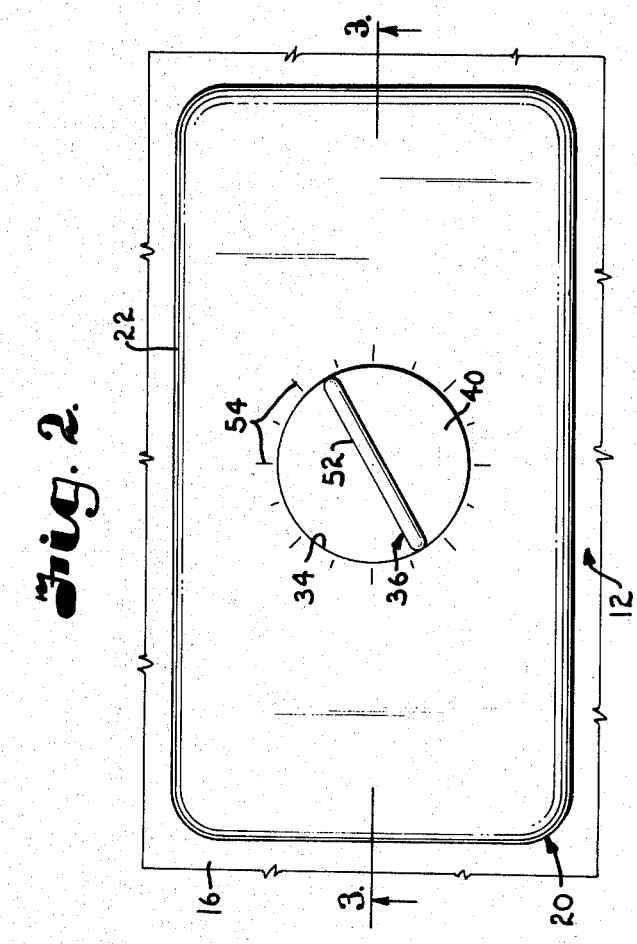
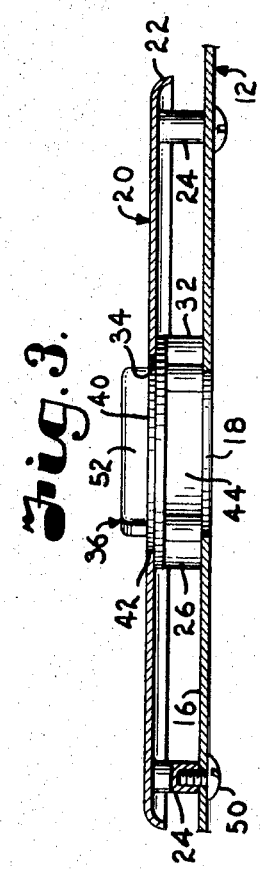
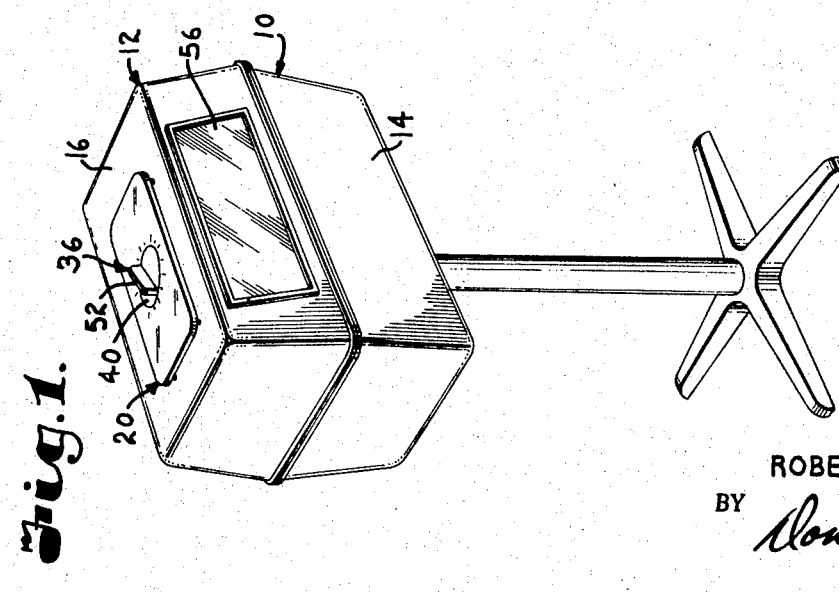
INVENTOR.
ROBERT L. McGAUGHEY
BY *Don M. Bradley*
ATTORNEY PATENTED JAN 19 1971 3,556,078
SHEET 2 OF 2
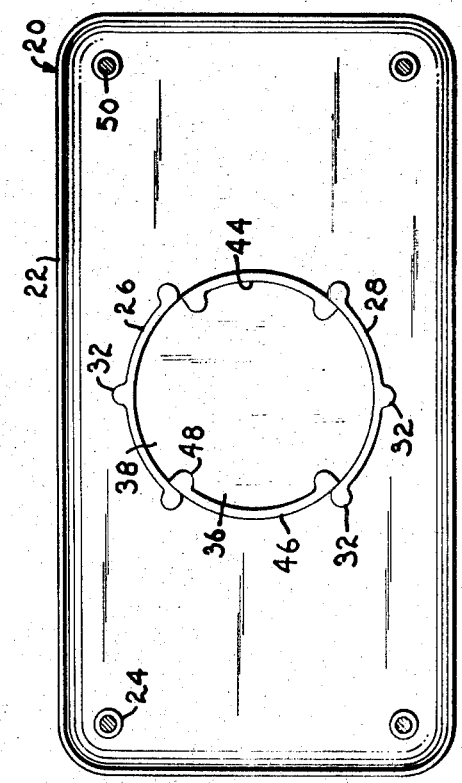
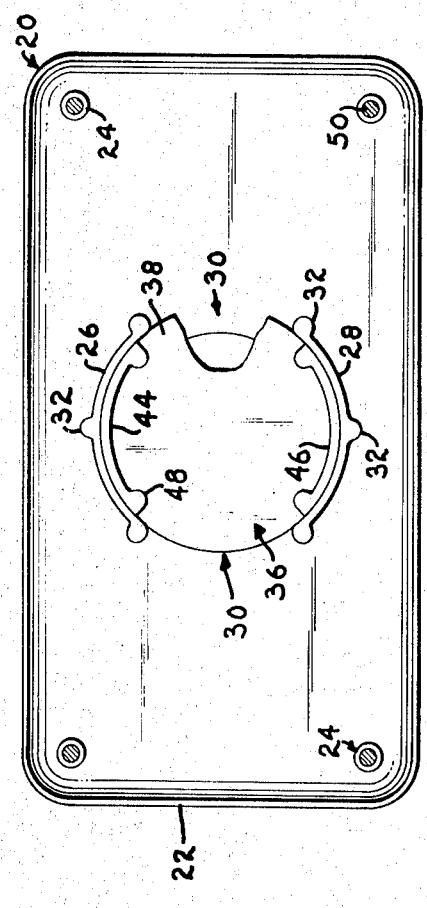
INVENTOR.
ROBERT L. McGAUGHEY
BY
Don M. Bradley
ATTORNEY

BARBECUE GRILL

This invention relates to cooking apparatus, and more particularly, to an outdoor barbecue grill.

Grills of this general type are in common usage for outdoor cooking of a variety of items. Many grills are disposed in permanent or semipermanent outdoor installations and may be utilized for cooking purposes even in inclement weather. These grills are provided with hinged, inverted dish-shaped covers which are commonly utilized for retaining the smoke in the grill during the cooking operation. This smoke enhances the flavor of food prepared by this method.

There must, of course, be sufficient air admitted into the grill to sustain combustion for generating the heat used for cooking. This requires the provision of some form of air inlet means in the grill.

The ideal location for the air inlet is in the top of the grill cover. This location permits distribution of the admitted air uniformly throughout the entire grill and also permits the outlet of a limited amount of smoke drawn uniformly from the interior of the grill. This top position for the air inlet is also the one most likely to admit the moisture during inclement weather. Manifestly, it is important to exclude such moisture because of the deleterious effects on the interior of the grill or the food which is being prepared, and because it may retard or extinguish the cooking fire.

Attempts have heretofore been made to provide a weather shield which overlaps the top opening and which is spaced upwardly from the grill cover to provide an air inlet for the grill. While these shields are beneficial in excluding moisture, the size of the air passage is fixed in heretofore available structures eliminating the possibility for adjusting the air inlet to help regulate the cooking fire.

Accordingly, it is the primary object of this invention to provide a novel grill cover having a protective weather shield but presenting an air inlet passage, the size of which may be readily regulated.

Another important object of this invention is to provide an easily adjustable damper in a weather shield which does not detract from the protective characteristics of the shield.

Still a further object of the present invention is to provide a rotatable air inlet damper which is constructed in a manner to eliminate passage of water through the damper even though the damper is installed in the top of an outdoor cooking grill.

Yet another object of this invention is to provide a weather proof grill cover having a highly reliable air control damper which may be economically fabricated from a relatively few parts and which requires virtually no maintenance.

A yet further object of the invention is to provide a grill cover provided with a damper and corresponding indicia by which the operator may readily determine the size of the damper air passage even though the passage is obstructed from view by a protective weather shield.

These and other important objects of this invention will be further explained or will become apparent from the specification, claims and drawings.

In the drawings;

FIG. 1 is a perspective view on a reduced scale of a grill embodying the principles of this invention;

FIG. 2 is a fragmentary, top plan view of the grill cover;

FIG. 3 is a cross-sectional view taken along line 3-3 of FIG. 2;

FIG. 4 is a bottom plan view of the weather shield and damper assembly showing the damper in its open position, parts being broken away to reveal details of construction; and FIG. 5 is a view similar to FIG. 4 but showing the damper in its closed position.

A grill embodying the principles of this invention is broadly designated in FIG. 1 by the reference numeral 10 and includes an inverted, dish-shaped cover body 12 adapted to be hingedly secured to the lower section 14 of the grill 10. The uppermost flat surface 16 of body 12 is provided with a centrally located circular opening 18 (FIG. 3). A generally planar weather shield 20 having a downturned peripheral rim 22 is provided with integral depending legs 24 adapted to rest on surface 16 of cover 12. The legs 24 support shield 20 in vertically spaced relationship from surface 16 with the shield extending in overlapping relationship across opening 18. A pair of elongated semicircular circumferentially spaced apart walls 26 and 28 are formed integral with the lowermost surface of shield 20 and depend downwardly from the latter to span the distance between the shield and upper surface 16 of cover 12. Thus, walls 26 and 28 provide a barrier extending across the air inlet defined by the spacing between shield 20 and cover 12.

The ends of the walls 26 and 28 are spaced apart from one another as shown in FIGS. 4 and 5 to present gaps 30 in the barrier. The gaps 30 provide a passage for air from the inlet to opening 18. It is contemplated that walls 26 and 28 may be cast integrally with shield 20 and integral enlargements 32 of walls 26 and 28 disposed at spaced intervals along the latter provide additional reinforcement for the walls. It should be noted, however, that the innermost surfaces of walls 26 and 28 define a circle partially defined by the walls.

Shield 20 is provided with a centrally disposed circular aperture 34 in axial alignment with opening 18. A rotatable damper broadly designated 36 projects through aperture 34. Damper 36 includes a circular flange 38 which projects outwardly from an upwardly projecting body portion 40. The latter is provided with an outwardly facing annular shoulder 42 (FIG. 3) which complementally engages the edge of cover 20 defining aperture 34. The upper marginal peripheral surface of flange 38 underlies the lowermost surface of shield 20 surrounding aperture 34. The damper is supported in this position with a relatively close sliding fit between the shield 20 and shoulder 42 and flange 38 by depending walls 44 and 46 which are integral with the lower most surface of the flange 38.

The walls 44 and 46 are semicircular and are circumferentially spaced apart as shown in FIGS. 4 and 5. The circle defined by the outer surface of walls 44 and 46 is of smaller diameter than the circle defined by walls 26 and 28 so that damper 36 may be freely rotated in aperture 34 with the lowermost surface of walls 46 slidably engaging the upper surface 16 of cover 12. The walls 44 and 46 complementally fit within walls 26 and 28 so that the spacing between the ends of the respective walls 44 and 46 may be rotated to the position illustrated in FIG. 4 where such spacing is aligned with the gaps 30. On the other hand, the walls 44 and 46 may be rotated to the position illustrated in FIG. 5 where the walls 44 and 46 effectively close the gaps 30. It should be noted that the length of each wall 44 and 46 is greater than either of the gaps 30 so that the walls 44 and 46 provide structure for closing the gaps when desired. Manifestly, any intermediate position of damper 36 is available for partially closing the gaps to any extent desired.

It is contemplated that damper 36 may be cast as an integral unit. Accordingly, reinforcing enlargements 48 are provided on each of the wall structures 44 and 46 to enhance the rigidity thereof.

The weather shield and damper assembly are installed on cover 12 in the positions illustrated in the drawing. Suitable screws, rivets or the like 50 are secured to legs 24 through cover 12 for fastening the assembly in this position. A knob 52 which may be elongated as illustrated projects upwardly from the upper surface of portion 40 and is alignable with indicia 54 provided on the upper surface of shield 20 surrounding aperture 34 to indicate the position of relative rotation of damper 36 with respect to shield 20. This, of course, indicates to the operator the extent of the air passage into the grill even though the components defining the passage may be obstructed from view. Preferably, grill 10 is provided with a visual observation window 56 to facilitate indication to the operator optimum adjustment for the damper to provide the desired cooking conditions.

It should be noted that aperture 34 is of a greater diameter than opening 18. Further, the wall structures 44 and 46 and the walls 26 and 28 of the barrier surround opening 18. This construction eliminates any tendency for water to leak past damper 36 and through opening 18. Further, the outwardly projecting flange 38 together with the close spacing between shoulder 42 and the edge of aperture 34 tend to eliminate the possibility of precipitation entering the grill. On the contrary, the water striking the upper surface of damper 36 tends to run toward the surface of shield 20 which deflects the water outwardly and away from the air opening 18.

I claim:

1. A cover for an outdoor grill comprising:
a cover body provided with a draft opening in the top of the body;
a generally planar weather shield overlapping the opening, said shield having an aperture aligned with the opening;
means supporting the shield on the body in vertically spaced relationship from the upper surface of the latter, the spacing between the shield and the body presenting an air inlet;
a barrier surrounding the opening and spanning the distance between the shield and the body, there being at least one gap in the barrier for passage of air from the inlet to the opening;
a rotatable damper in the aperture closing the latter, said damper including structure carried by the damper and disposed to close said gap in the barrier when the damper is rotated to a predetermined position, whereby to selectively restrict the passage of air into the grill.

2. The invention set forth in claim 1, wherein said barrier and said structure are semicircular, the structure being of lesser diameter than the barrier and being disposed for rotation along a circular path of travel within the circle partially defined by said barrier.

3. The invention of claim 2, wherein said opening is circular, and wherein the circle defined by said barrier is of greater diameter than the opening, said structure being disposed to slidably engage the upper surface of the body between the barrier and the opening.

4. The invention of claim 3, wherein the aperture is circular, said damper including an upwardly extending portion projecting through the damper, said portion presenting an annular, outwardly facing shoulder disposed to slidably engage the inner edge of said shield defining said aperture.

5. The invention of claim 4 wherein said damper includes an outwardly extending flange integral with said portion, said flange having an upper surface extending beneath said shield entirely around said aperture.

6. The invention of claim 5, wherein said structure is secured to the lowermost surface of the flange.

7. The invention of claim 1, wherein said barrier includes a pair of elongated, semicircular walls integral with the lowermost surface of the shield and depending therefrom, the walls being spaced circumferentially around the opening to present a pair of said gaps between the ends of the walls.

8. The invention of claim 7, wherein said structure includes a pair of circumferentially spaced, semicircular wall structures integral with the damper and depending therefrom, said wall structures being shaped to complementally fit within the circle defined by the barrier walls and each wall structure having a length at least as great as the length of each of said gaps.

9. The invention of claim 8, wherein said damper is provided with knob means projecting upwardly through said aperture to facilitate manual rotation of the damper, and wherein said shield is provided with indicia around the aperture to indicate the relative rotated position of the damper with respect to the shield, whereby to reveal the position of said wall structures with respect to said gaps.

10. The invention of claim 9, wherein is provided a window in the cover body for visual observation of the interior of the grill to indicate optimum regulation of said damper.